H. M. RHODES.
SEED HARVESTING MACHINE.
APPLICATION FILED JAN. 27, 1917.
1,269,742.
Patented June 18, 1918.
5 SHEETS—SHEET 4.
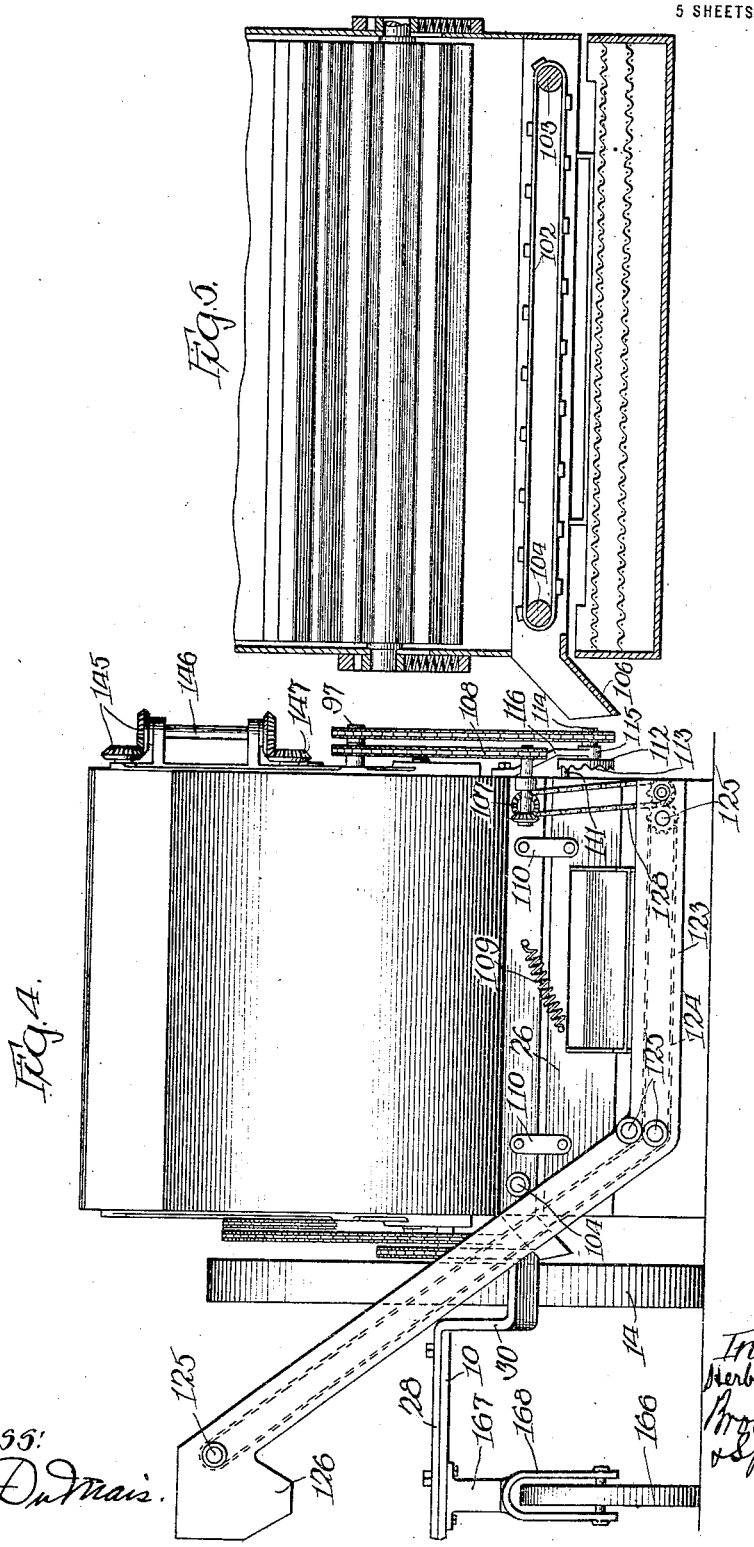

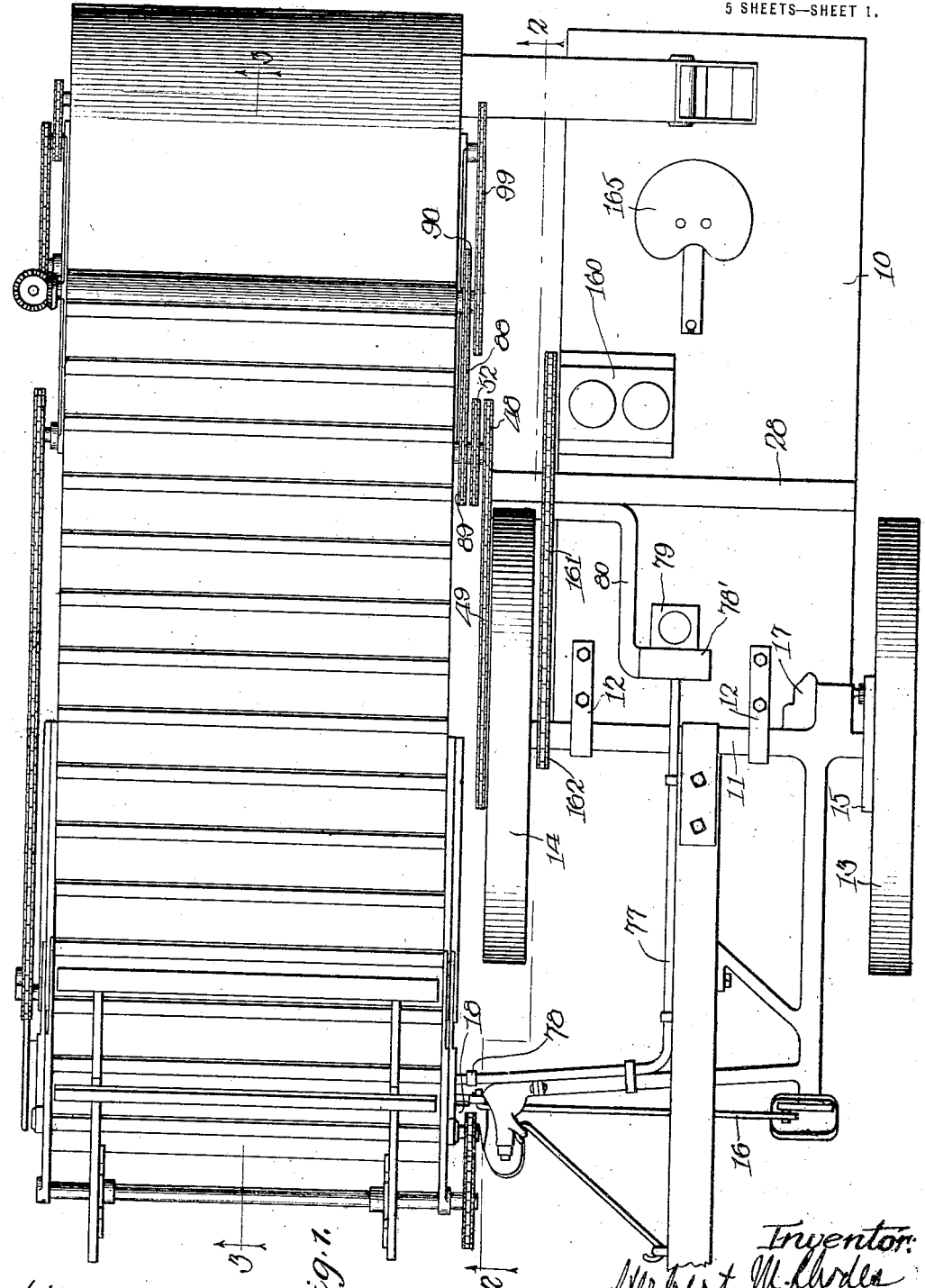

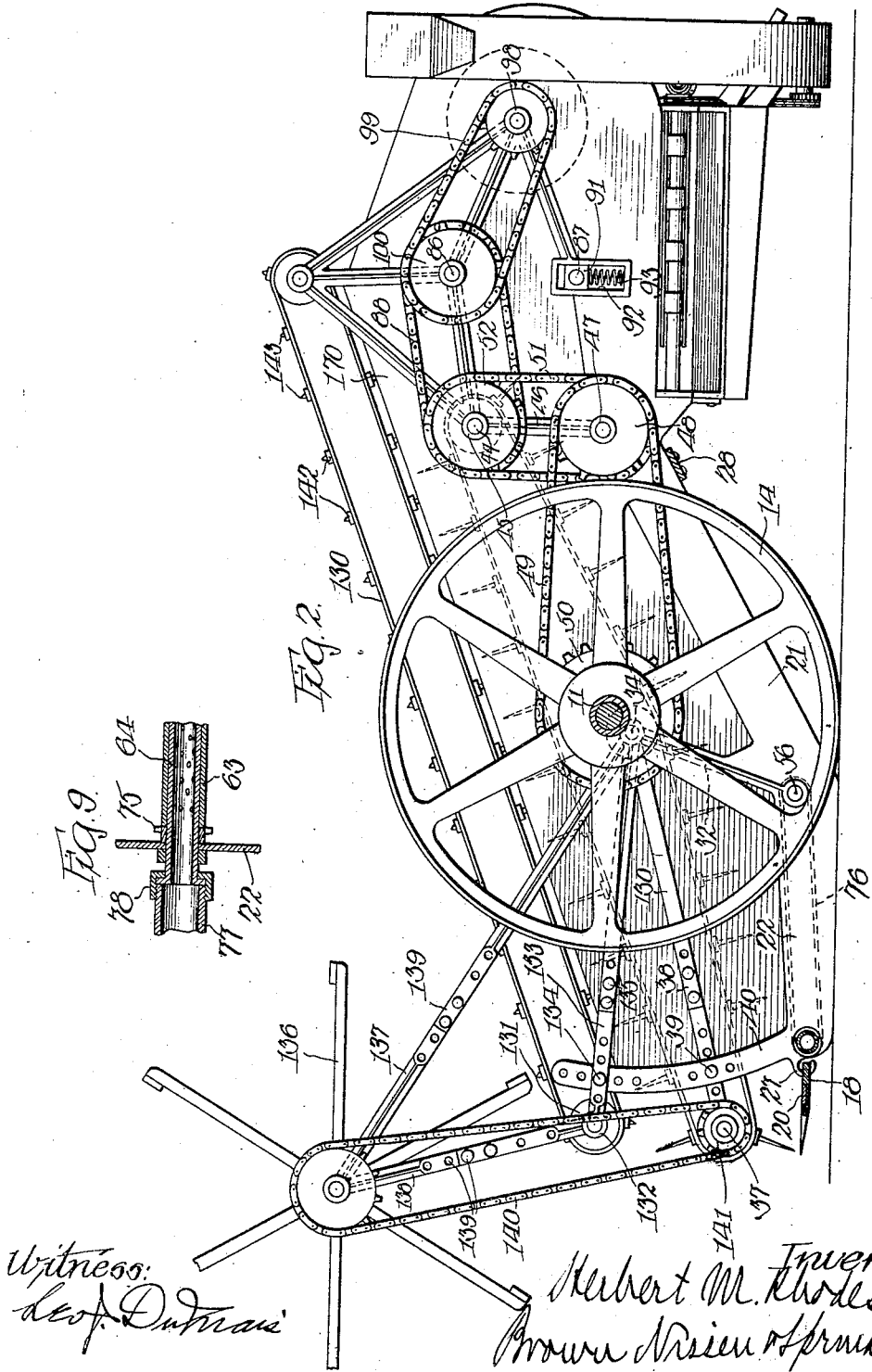

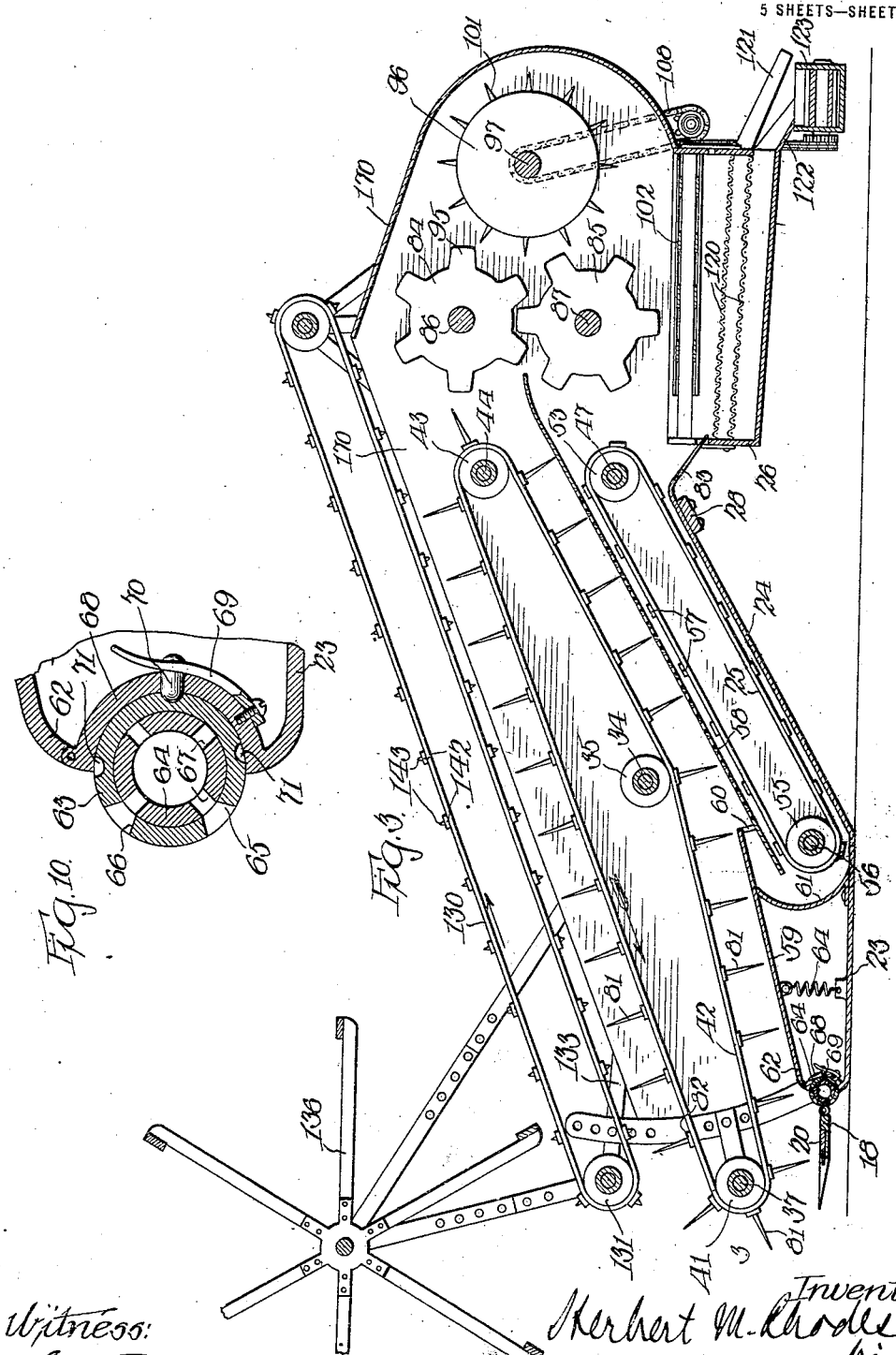

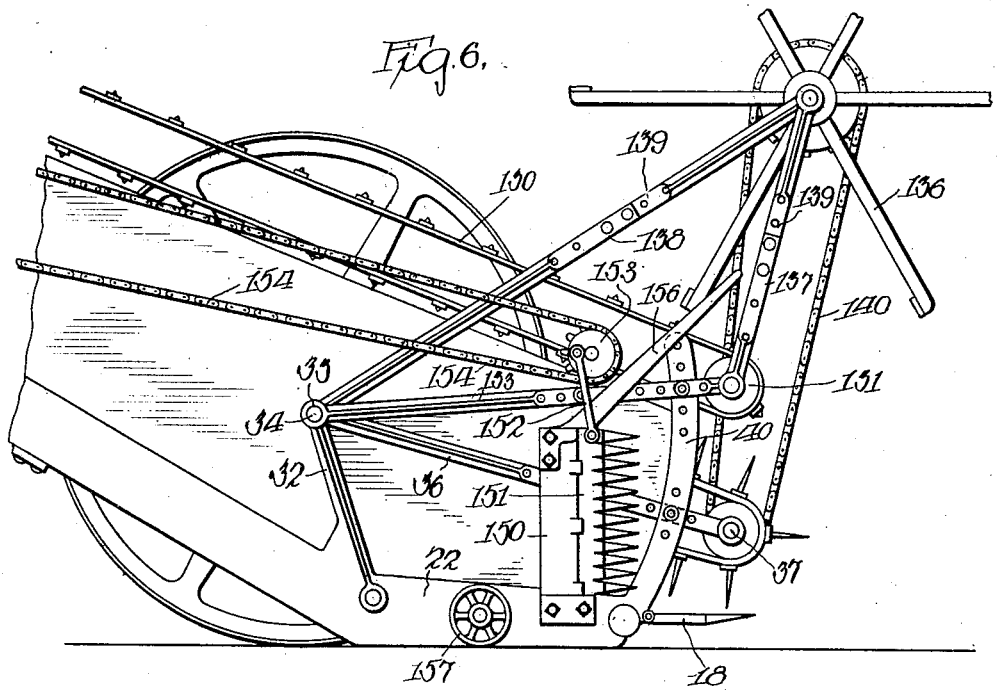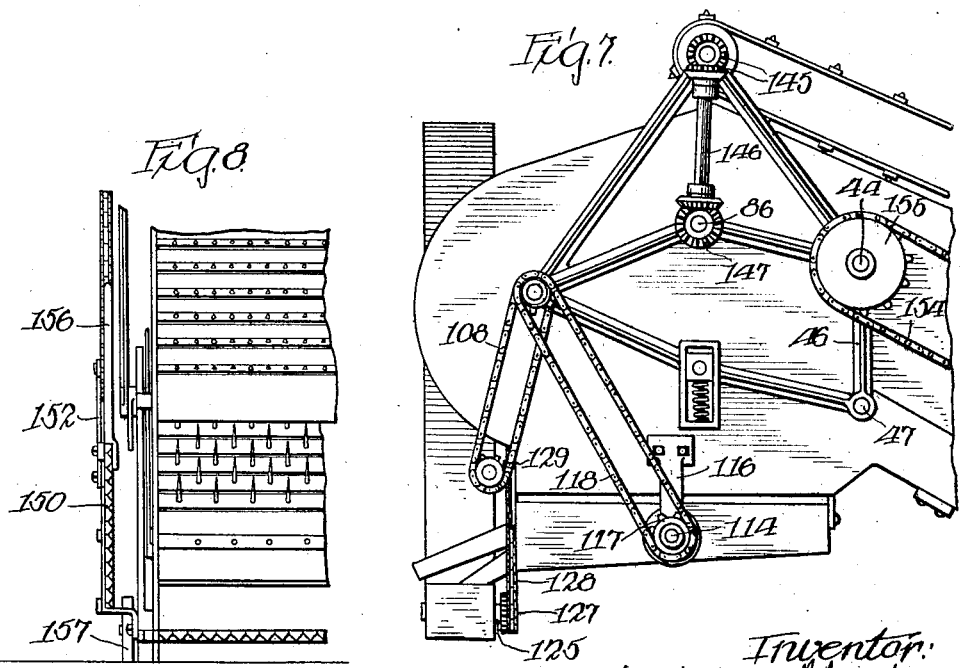

UNITED STATES PATENT OFFICE.

HERBERT M. RHODES, OF NATCHEZ, MISSISSIPPI.

SEED-HARVESTING MACHINE.

1,269,742.
Specification of Letters Patent.
Patented June 18, 1918.

Application filed January 27, 1917. Serial No. 144,807.

*To all whom it may concern:*

Be it known that I, HERBERT M. RHODES, a citizen of the United States, residing at Natchez, in the county of Adams and State of Mississippi, have invented a certain new and useful Seed-Harvesting Machine, of which the following is a specification.

This invention relates to a machine for cutting the standing stalks of grains and seed-bearing grasses, and has for its object the provision of a machine of this character which shall be of improved construction, and more efficient in its operation than harvesters previously used for crops of this character.

The invention is exemplified in the combination and arrangement of parts shown in the accompanying drawings and described in the following specification, and it is more particularly pointed out in the appended claims.

In the drawings—

Figure 1 is a top plan view of a machine embodying the present invention.

Fig. 2 is a sectional elevation on line 2—2 of Fig. 1.

Fig. 3 is a sectional elevation on line 3—3 of Fig. 1.

Fig. 4 is a rear elevation of the machine with parts broken away.

Fig. 5 is a vertical sectional view of a portion of the machine showing the screening arrangement.

Fig. 6 is a fragmentary elevational view of the outer end of the sickle bar and associated parts.

Fig. 7 is a fragmentary elevational view of a part of the machine showing the driving mechanism for the seed-cleaning apparatus.

Fig. 8 is a fragmentary front elevational view of the outer end of the sickle bar and the associated parts; and Figs. 9 and 10 are detail sectional views of one of the parts of the machine.

In the drawings, the numeral 10 designates a platform which is hinged to the casing 11 of a mowing machine axle by means of straps 12. 13 designates the outer wheel, and 14 the inner wheel of the mowing machine, which wheels are connected by the usual ratchet mechanism with the transverse shaft of the machine which passes through the casing 11. An internal gear 15 is secured to the mowing machine shaft in the usual manner and drives the pitman rod 16 of the mowing machine through gearing included in the casing 17, all of which is the well-known mowing machine construction. A sickle bar 18 is secured to the mowing machine in the usual manner, and is provided with the usual sickle 20 for cutting the standing grain or grass. Positioned at one side of the mowing machine frame, and in the rear of the sickle bar 18, is a trough-shaped casing 21, having side plates 22 of sufficient strength to give rigidity to the frame, and having a bottom plate 23, Fig. 3, which rests upon the surface of the ground, and which has an upwardly inclined section 24 over which shattered seed is carried by a conveyer belt 25 and discharged into a cleaning trough 26, as will be more fully explained. The trough 21 is secured to the rear of the sickle bar 18 by hooks 27 which leave the bar free to be tilted to accommodate different conditions of grass or grain to be cut. The trough is supported at the rear central portion of the machine by a bar 28 which is secured to the top of the platform 10, as shown in Fig. 1, and which has a downwardly extending portion 30 to bring the projecting end of the bar in position to be secured to the bottom of the plate 24, as shown in Fig. 3. This bar extends entirely across the machine to support and propel the operating mechanism in the rear of the sickle bars. Extending upwardly from the side plates of the trough 21, on each side of the machine, is an arm 32, having a bearing 33 at the upper end thereof. A shaft 34 is journaled in the bearings 33 and extends transversely across the machine and carries a roll 35 for a purpose to be described. Journaled on the shaft 34, adjacent the bearings 33, is a pair of arms 36, carrying a shaft 37 at their outer ends. The arms 36 are provided with an adjustable splice, as shown at 38, for changing the length of the arms which may be held in adjustable vertical position by bolts 39, by means of which the arms are secured to upright arcuate standards 40 projecting upwardly from the side plates 22 of the trough 21 at the forward end of the trough. By this arrangement it is apparent that the position of the shaft 37 may be adjusted both vertically and horizontally relative to the sickle bar 18. The shaft 37 carries a roller 41, over which a conveyer belt 42 passes. The belt 42 at its rear end passes over a roller 43, carried on a shaft 44, journaled in bearings 45, supported on a framework 46 which extends upwardly from the side bars 22, there being a duplicate framework 46 on each side of the machine. Below the shaft 44 is a similar shaft 47 carried in bearings in the side plates 22, and which has on the end thereof, adjacent the frame 10, a sprocket wheel 48, connected by means of a chain 49 with a sprocket wheel 50 secured to the drive shaft of the mowing machine. The shaft 47 carries a second sprocket wheel, which is connected by a chain 51 with a sprocket wheel 52 secured to the shaft 44, by which arrangement the shaft 44 is driven. The shaft 47, as shown in Fig. 3, is provided with a roller 53 over which the conveyer belt 25 passes. The lower end of the conveyer belt 25 passes over a roller 55, carried by a shaft 56, journaled in the side plates 22. The conveyer 25 is provided with slats 57 which slide upon the upper surface of the base plate 24, and carry upwardly before them any grain or seed which may be deposited upon this plate. Above the upper run of the conveyer 25 is a perforated plate 58, the upper surface of which is directly below the lower run of the conveyer 42. A plate 59 is positioned beneath the lower end of the conveyer 42, near the front thereof, and has a downwardly extending lip 60 which bears upon the upper surface of the plate 58. The plate 59 rests upon a curved plate 61 positioned in front of the lower end of the conveyer 25 and secured to the upper surface of the base plate 23. The forward end of the plate 59 is provided with a downwardly extending lip 62 positioned adjacent the periphery of a casing tube 63 Fig 10. The tube 63 surrounds a perforated hollow roller 64, and is provided with openings 65 and 66, through which the perforations 67 in the roller 64 communicate with the outer atmosphere. As shown in Figs. 3 and 10, the forward end of the base plate 23 is provided with an upwardly projecting curved plate 68 which lies against and covers the rear portion of the casing 63, and has hinged connection with the downwardly projecting lip 62 of the plate 59. A spring clip 69 is secured to the projection 68, and is provided with a pin 70 which passes through an opening in the projection 68 and into any one of a series of openings 71 in the casing 63. By means of this arrangement the casing 63 may be adjusted so that both of the openings 65 and 66 will be exposed, as shown in Fig. 3, or it may be rotated so that the opening 65 will be covered by the projection 68, placing the opening 66 in the position occupied by the opening 65 in the figure. The casing may also be rotated in the opposite direction so that the opening 65 will take the position occupied by the opening 66 in the figure, and the opening 66 will be covered by the projection 68. The roller 64 is connected to a suction fan, by means to be described, so that when the machine is running, loose or shattered seeds are drawn into the roller through the openings 65 and 66 and the perforations in the roller, and are conducted to the cleaning mechanism to be described. By the adjustment just described, the openings 65 and 66 may be located so that air may be drawn inwardly from a position above the sickle bar 18 through the opening 66, and also from a position adjacent the surface of the ground through the opening 65. In this way seeds that are shattered from the stalks being cut will be drawn through the opening 66 into the suction roller, and loose seeds on or near the ground will be drawn through the opening 65 into the roller. If the condition of the grain does not warrant the use of both of the openings, the mechanism can be set so that seeds will be drawn into the roller from a single position only, thus directing all of the strength of the suction device to the gathering of seeds from the ground, or from the stalks being cut, as the conditions may require.

The suction roller 64 is journaled in the side plates 22, as shown particularly in Fig. 9, and has a sprocket wheel 75 secured thereto, by means of which it is given a rotary motion through a connection with the shaft 56, by means of a sprocket chain 76. This rotation of the shaft is for the purpose of preventing the perforations in the suction tube from becoming clogged with material drawn against the tube, and thus interfering with the gathering of the seeds. By the rotation of the tube the material which is too large to pass through the perforations is constantly scraped off by the edges of the surrounding casing 63, and new perforations are brought into position to receive the incoming seeds. A flexible hose 77 is connected with the end of the rotary suction tube by means of a coupling 78 which permits rotation of the tube independently of the hose, as shown in Fig. 9. The hose 77 may be conducted to a suction fan 78' located at any convenient position, and driven by a motor 79. The discharge hose 80 from the fan 78' carries the material gathered by the suction roller into the cleaning mechanism to be described. The conveyer 42 is provided with a series of outwardly extending spikes 81, carried on cross slats 82. The spikes 81 extend to a position in front of the sickle and gather the material being cut and carry it into the sickle bar, thus insuring the collection of all of the material, even though it be in a down and tangled condition. As soon as the stalks are cut, they are carried backwardly past the suction roller 64 and onto the plate 59. Any seeds which shatter from the stalks as they pass from the sickle to the plate 59 will be collected by the suction roller, and any seeds that fall upon the plate 59 will be carried by the inwardly moving stalks over the ledge 60 of the plate 59. This ledge 60 is provided with slots or perforations through which the seeds may pass into the space occupied by the conveyer 25, from whence they will be carried upwardly by this conveyer and discharged over the chute 83 at the upper edge of the plate 24 into the shaker box 26. As the stalks continue to move upwardly over the perforated plate 58, any other seeds which shatter out will pass through the perforations in the plate 58, and also be carried upwardly by the belt 25 and discharged into the shaker box. At the upper end of the conveyer 42 the grain or grass stalks are discharged from the plate 58 in a position to be grasped by a pair of rollers 84 and 85, carried on shafts 86 and 87 respectively. The shaft 86 is driven by a sprocket chain 88, passing over a sprocket wheel 89 on the shaft 44, and a similar wheel 90 on the shaft 86. The shaft 87 is carried in bearings 91, mounted in slideways 92, carried by the frame-work of the machine. The bearings 91 are resiliently pressed upwardly toward the shaft 86 by springs 93. The rollers 84 and 85 have longitudinally extending ridges or corrugations 95, which loosely intermesh with one another, and by means of which the roller 85 is driven from the roller 84. As the material is discharged from the conveyer 42, it is grasped by the rollers 84 and 85, and as the stalks are passed between the rollers they produce a rubbing action upon the seed pods and extract a great many of the seeds which fall downwardly into the shaker box 26. To insure the removal of all of the seeds from the stalks, a third roller or cylinder 96 is provided, which is carried on a shaft 97, journaled in bearings 98 in the frame of the machine, and which is driven by a sprocket chain 99 from a sprocket wheel 100 on the shaft 86. The cylinder 96 is provided with teeth 101 which engage the straw as it is discharged from the rollers 84 and 85 and thoroughly shatter all of the seed from the straw, the straw being held by the rollers 84 and 85 and gradually fed to the cylinder 96 to effect this result. As the straw is discharged from the cylinder 96 by the rollers 84 and 85 it will fall upon a conveyer belt 102, carried on rollers 103 and 104, see also Fig. 5, from whence the straw is discharged over a chute 106 into a position beneath the platform of the machine and out of the path the machine will take at the next cut. The rollers 103 and 104, as shown in Fig. 4, are journaled in the stationary portion of the shaker box, or more correctly, in the frame-work of the machine just above the shaker box, and the roller 103 is driven by beveled gearing 107 and a sprocket chain 108 which connects with the sprocket wheel on the shaft 97, as shown in Figs. 3 and 4. Suspended below the conveyer belt 102, by links 110, Fig. 4, is the shaker box 26, which is provided with a spring 109 normally drawing the box to the right, as viewed in that figure. A pin 111 projects from the box, as shown at the right in Fig. 4, and engages with a wheel 112, having a series of corrugations 113 on the inner surface thereof. The wheel 112 is rigid with a shaft 114, journaled in a bearing 115, carried on the end of an arm 116, which is secured to the frame of the machine, as shown in Figs. 4 and 7. The shaft 114 is also provided with a sprocket wheel 117, driven by a chain 118, which connects with a sprocket wheel on the shaft 97. As the wheel 112 is rotated by the mechanism thus described, the pin 111 will be intermittently moved inwardly against the tension of the spring 109, and thus a shaking or reciprocatory movement is imparted to the trough 26. Any suitable number of screens 120 are removably mounted within the trough or shaker box 26 for screening the seeds which pass downwardly from the rollers 84, 85 and 96, and through the conveyer belt 102. The screenings from the box 26 pass outwardly at the rear of the machine over a chute 121, and the clean seeds are discharged through a chute 122 into a conveyer trough 123 carried at the rear of the machine. Within the trough 123, is a belt 124 which passes over suitable rollers 125 and elevates the seeds to a spout 126 located above the frame-work of the machine, at which point the seeds are discharged into suitable bags. One of the rollers 125, as shown in Fig. 7, is driven from a sprocket wheel 127, on which a chain 128 passes upwardly, and is driven by a sprocket wheel 129 carried on the end of the conveyer roll 103.

Located above the conveyer 42, as shown in Figs. 2 and 3, is a third conveyer 130. This conveyer is supported at its forward end on a roller 131, which is journaled in bearings 132 on the ends of a pair of arms 133. The arms 133 are pivoted at their rear ends on the shaft 34 and are adjustably supported at their forward ends by bolts 134, by means of which the ends of the arms are secured to the arcuate standards 40. The arms 133 are also provided with telescoping joints 135, by means of which the position of the roller 131 may be shifted. As the roller 131 is shifted to lengthen the reach of the belt 130, the belt must be shortened or extended to accommodate the different lengths of travel. It is usual in such belts to provide straps and buckles for this purpose. A similar arrangement is employed in connection with belt 42 and roller 41. A reel 136 is supported by arms 137 and 138 above and slightly in front of the forward end of the conveyer belt 130. The arms 137 and 138 are provided with adjustable connections 139 similar to those in the arms 36 and 133. The reel 136 is driven by a chain 140, which passes over a sprocket wheel 141 carried on the shaft 37. This chain may also be lengthened or shortened to accommodate adjustable positions of the reel and the shaft 37. The belt 130 is provided with cross slats 142, carrying a series of short spikes 143. This belt and reel are for the purpose of gathering high growing weeds frequently found in fields of grasses and grains, the seeds of which weeds are very difficult to separate from the grass seeds and grain. The high weeds are caught by the reel and carried backwardly into contact with the front portion of the conveyer 130, where they are seized by spikes upon the conveyer and carried upwardly over the top of the machine and discharged at the rear thereof. Since the branches and leafy part of the weeds are located at the upper ends, the weeds are easily held by the reel and conveyer 130 while the grass stems are separated from the lower stalks of the weeds by a sort of combing action produced by the spikes 81 on the conveyer belt 42. If it is found that these spikes have a tendency to draw some of the weeds with them into the lower portion of the machine, the shaft 37 may be adjusted inwardly until this tendency is overcome, the best position for different conditions being easily ascertained by an experienced man. The conveyer 130 is driven by beveled gearing 145, connected with an upright shaft 146, Figs. 4 and 7, which is driven by a beveled gear 147, carried on the end of the shaft 86.

It sometimes happens that grass and grain is so much tangled and interwoven that it is difficult to separate the grain which is cut from that which is still standing. To avoid this difficulty, a short upright sickle bar 150 is secured to the outer side plate 22, as shown in Fig. 6, and is provided with a sickle 151, driven by a pitman rod 152, connected with a sprocket wheel 153, which is in turn driven by a chain 154 passing over a sprocket wheel 155 on the shaft 44. A forwardly and upwardly inclined bar 156 is secured to the upper end of the sickle bar 150 for the purpose of guiding the stalks to be cut downwardly to the sickle in case the stalks extend above the upper end of the bar. A roller 157 is preferably secured to the outer side of the frame 22 for supporting the frame at that side.

As thus far described, the mechanism has been treated as being driven from the main shaft of the mower, but it may sometimes happen that it will require more power to drive the mechanism than is easily available from the motion of the mower, and to supply this extra power, an engine 160 may be mounted upon the platform 10 and connected by means of a belt 161 to a pulley 162 secured to the main shaft of the mowing machine. By this arrangement the engine 160 can be used to supplement the power of the mowing machine wheels for driving the main shaft of the machine and the mechanism connected thereto. Since it is usual to connect the main shaft of the machine to the drive wheels of the mower by ratchet mechanism, it is only necessary to operate the engine 160 at a little higher speed than would be imparted by the motion of the mower to cause the engine 160 to operate all of the parts of the machine, thus confining the work of the draft animals to the mere propulsion of the device. The engine, of course, may be disconnected in the cutting of crops where the work is not sufficiently heavy to require this additional power, in which case the machinery can be driven from the wheels of the mowing machine proper. A seat 165 is provided for the driver. The rear end of the platform 10 is supported by a wheel 166 attached to the underside of the platform by a bracket 167 to which the wheel fork 168 is pivotally secured to permit lateral turning of the wheel 166 when the machine is turned around corners. The sides and the rear of the entire conveying and separating mechanism are covered by a sheet metal casing member 170 which is attached to the side plates 22 and the framework of the machine.

This machine will be found to be especially valuable in harvesting clovers and other grasses which have heretofore been grown principally for the hay provided by the stalks and blades of the grass. In many instances no effort has been made to recover the seed, which is very valuable, but which was permitted to lie upon the ground and waste because of the difficulty experienced in harvesting it. In some of the States such crops as lespedeza, alfalfa and similar clovers are extensively raised for hay and no effort is made to take advantage of the value of the seed. Where the present invention is used for harvesting such crops, the seed which is saved represents so much clear gain, and in many cases far exceeds the value of the total crop as previously harvested. The weed separator greatly enhances the value of the seed thus saved, as grass seed and small grain, such as rice, are much more valuable where they are free from weed seed, than where they are mixed with such foreign substances.

I claim:

1. In a harvester, mechanism for cutting seed bearing plants near the base thereof, a suction device for collecting seeds shattered therefrom, and means for propelling said suction device over the surface of the ground and in close proximity thereto.

2. In a harvester, a gathering device for shattered seeds comprising a suction head having screening mechanism for separating the seeds from other portions of the plants and for preventing the separated portions of the plants from entering said head, and means for maintaining said suction head in a position relative to said harvester where shattered seeds occur.

3. In a harvester, means for cutting seed bearing plants, a suction device for gathering loose seeds, and mechanism other than said suction device for disposing of the plant stalks independently of said suction device.

4. In a harvester, a sickle for cutting seed-bearing plants, and a suction-head provided with an intake opening near the ground in the rear of said sickle.

5. In a harvester, a sickle for cutting seed-bearing plants, and a suction-head provided with an intake opening positioned in the rear of said sickle and adjacent thereto.

6. In a harvester, a sickle for cutting seed-bearing plants, and a suction-head having an intake opening arranged adjacent the position taken by the plants when severed by said sickle, said suction head having screening mechanism for preventing stalks from entering said head.

7. In a harvesting machine, a sickle for cutting seed-bearing plants, and a suction-head having a pair of intake openings, one of which is directed downwardly for receiving seed lying adjacent to and upon the ground and the other of which is directed upwardly for receiving seed shattered from the falling plants.

8. In a harvesting machine, means for cutting seed-bearing plants, mechanism for transferring the plants so cut, and a suction device separate from said mechanism and provided with an intake opening for receiving seed from the plants severed by said cutting means.

9. In a harvesting machine, means for cutting seed-bearing plants, a suction device having a pair of differently directed intake openings, and means for closing either of said openings.

10. In a harvesting machine, a suction-head for gathering loose seeds comprising a tube having perforations spaced circumferentially thereabout, and means for rotating said tube to bring said perforations successively into receiving position.

11. In a harvesting machine, a device for collecting shattered seed comprising a hollow tube having perforations therein, and means for removing foreign material from the surface of said tube.

12. In a harvester, a device for collecting shattered seeds comprising a hollow tube having perforations therein, means for rotating said tube, and means for contacting with the periphery of said tube to remove material therefrom when said tube is rotated.

13. In a harvesting machine, means for severing seed-bearing plants, an upwardly inclined platform for receiving said plants, and means for moving said plants upwardly over said platform, said platform being provided with a shoulder or offset having rearwardly directed openings therein to permit seed carried by said plants along said platform to move backwardly and downwardly and thus be separated from said plants.

14. In a harvesting machine, means for cutting seed-bearing plants, an upwardly inclined platform for receiving said plants, said platform having a lower imperforate section and an upper perforated section, and means for moving said plants upwardly along said platform.

15. In a harvesting machine, means for cutting seed-bearing plants, an upwardly inclined platform for receiving said plants, means for moving said plants upwardly along said platform, said platform comprising a lower imperforate section and an upper perforated section there being an offset or shoulder at the point of juncture between said section and openings in said offset to receive seed shattered from said plants.

16. In a harvesting machine, a sickle for cutting seed-bearing plants, a platform in the rear of said sickle for receiving said plants, and a suction device having its receiving opening located in the rear of said sickle and at the front of said platform for collecting seeds shattered from the plants severed by said sickle.

17. In a harvesting machine, a sickle for severing seed-bearing plants, an upwardly inclined platform for receiving said plants, a suction device at the forward end of said platform for collecting shattered seeds, means for moving said plants over said platform, said platform having a perforated section at the rear thereof, and means for collecting seeds which pass through the perforations in said section.

18. In a harvesting machine, a sickle for cutting seed-bearing plants, an upwardly inclined platform for receiving the plants severed by said sickle, perforations in said platform, a chamber beneath said platform for receiving seeds which pass through said perforations, and a conveyer within said chamber for transferring said seeds therefrom.

19. In a harvesting machine, a sickle for cutting seed-bearing plants, an upwardly inclined platform in the rear of said sickle, a conveyer for moving said plants rearwardly over said platform, said platform being provided with perforations to permit seeds to pass therethrough, and a conveyer beneath said platform for transferring said seeds.

20. In a harvesting machine, means for cutting seed-bearing stalks, and means for separating the stalks thus cut into different lots.

21. In a harvesting machine, means for cutting seed-bearing stalks, and means for separating high growing plants from those of lower growth.

22. In a harvesting machine, a sickle for cutting vegetation, and means positioned above said sickle for engaging high growing plants to prevent their mingling with plants of lower growth.

23. In a harvesting machine, a sickle for cutting seed-bearing plants, means for transporting the plants so cut, and means for restraining high growing plants to prevent their mingling with the plants conveyed by said first-mentioned means.

24. In a harvesting machine, a sickle, means positioned for engaging high growing plants as they are cut by said sickle, and means for separating lower growing plants from the lower portions of the stalks of said high growing plants.

25. In a harvesting machine, a sickle for cutting plants from the surface of the ground, means for engaging the tops of the plants so cut and raising them upwardly away from said sickle, and means for transporting said plants away from said sickle while they remain intact.

26. In a harvester, mechanism for separating high growing from low growing plants comprising a device for engaging the upper portions of high growing plants and lifting them upwardly away from the lower growing plants and separating devices for conveying the high-growing and low-growing plants.

27. In a harvester, mechanism for separating high growing from low growing plants comprising a sickle for simultaneously severing said plants from the surface of the ground, means for engaging the upper portions of the high growing plants and raising them upwardly, and means for preventing upward movement of the lower growing plants therewith.

28. In a harvesting machine, a sickle for cutting intermingled plants of different heights, means for engaging the upper portions of the higher plants, and means for combing the lower plants from the downwardly extending stalks of the higher plants.

29. In a harvester, a sickle for cutting plants from the surface of the ground, a series of movable spikes adjacent said sickle for moving plants severed by said sickle rearwardly, and a spike device above said series of spikes for engaging plants having a high growth and moving said plants upwardly.

30. In a harvesting machine, a sickle for severing plants from the surface of the ground, a conveyer spaced upwardly from said sickle and having devices thereon for engaging plants of higher growth and drawing said plants intact onto said conveyer to separate said plants from other plants of lower growth.

31. In a harvesting machine, a sickle for severing plants from the surface of the ground, a conveyer having the front end thereof spaced upwardly and slightly in advance of said sickle, and a reel coöperating with said conveyer to grasp plants of a higher growth and separate said plants from other plants of a lower growth.

32. In a harvesting machine, a sickle for severing plants from the surface of the ground, a pair of conveyers one above the other and having their forward ends positioned above and slightly in front of said sickle, and means on said conveyer for engaging plants severed by said sickle.

33. In a harvesting machine, a sickle for severing plants from the surface of the ground, a pair of conveyers positioned above said sickle and having their forward ends adjacent thereto, and means for adjusting the ends of said conveyer relative to one another and to said sickle.

34. In a harvesting machine, a device for severing plants from the surface of the ground, a pair of conveyers having their forward ends positioned adjacent to and above said severing device, one of said conveyers being arranged above the other, a reel for coöperating with the uppermost one of said conveyers, and means for adjusting the positions of said conveyers and reel relative to one another and to said severing device.

35. In a harvesting machine, a sickle for severing plants from the surface of the ground, a pair of conveyers arranged one above the other and having spikes thereon, the forward ends of said conveyers being positioned slightly in advance of said sickle, and means for driving said conveyers in opposite directions of one another.

36. In a harvesting machine, a sickle for severing plants from the surface of the ground, means for collecting seeds shattered from said plants and for separating said seeds from said plants during and subsequent to said severing operation, and mechanism for threshing from said plants the seeds remaining therein.

37. In a harvesting machine, a sickle for severing plants from the surface of the ground, means for collecting seeds shattered from said plants, means for threshing from said plants seeds remaining therein, and means for discharging said plants at one side of the position occupied by them when connected with the earth.

38. In a harvesting machine, a sickle for severing seed-bearing plants from the surface of the ground, means for collecting seeds shattered from said plants and for separating said seeds from said plants, and a screen for cleaning the seeds so collected.

39. In a harvesting machine, means for severing seed-bearing plants from the surface of the ground, seed gathering means adjustable for collecting seeds lying upon and adjacent to the ground and for collecting seeds shattered from said plants, and means for separating the seeds so collected from foreign substances mixed therewith.

40. In a harvesting machine, means for severing plants from the surface of the ground, means for collecting seeds shattered from said plants and for separating said seeds from said plants, threshing mechanism for separating seeds from said plants, a screening device, and mechanism for directing all of the seeds collected to said screening device.

In testimony whereof I have signed my name to this specification, on this 22d day of January, A. D. 1917.

HERBERT M. RHODES.

Copies of this patent may be obtained for five cents each, by addressing the "Commissioner of Patents, Washington, D. C."